United States Patent [19]
Schmidt

[11] 4,422,717
[45] Dec. 27, 1983

[54] COUPLING ARRANGEMENT FOR OPTICAL WAVEGUIDES

[75] Inventor: Bernhard Schmidt, Neunkirchen, Fed. Rep. of Germany

[73] Assignee: Felten & Guilleaume Carlswerk Aktiengesellschaft, Cologne, Fed. Rep. of Germany

[21] Appl. No.: 280,508

[22] Filed: Jul. 6, 1981

[30] Foreign Application Priority Data

Jul. 9, 1980 [DE] Fed. Rep. of Germany ....... 3025888

[51] Int. Cl.³ .............................................. G02B 7/26
[52] U.S. Cl. ................................................. 350/96.21
[58] Field of Search ................ 350/96.20, 96.21, 96.22

[56] References Cited

U.S. PATENT DOCUMENTS

| | | | |
|---|---|---|---|
| 4,208,095 | 6/1980 | Malsot | 350/96.21 |
| 4,302,072 | 11/1981 | Vucins | 350/96.21 |
| 4,368,949 | 1/1983 | Schmidt | 350/96.21 |

FOREIGN PATENT DOCUMENTS 2741367 12/1978 Fed. Rep. of Germany ... 350/96.21

53-20344 2/1978 Japan ............................. 350/96.21

*Primary Examiner*—John D. Lee
*Attorney, Agent, or Firm*—Michael J. Striker

[57] ABSTRACT

An arrangement for coupling optical fiber ends mounted in respective connectors includes an elongated hollow housing, a first clamping member of a prismatic configuration extending over the entire length of the housing and having a longitudinally extending V-shaped groove for partially receiving the connectors, and a pair of second clamping members each overlying one of the connectors in registry with the V-shaped groove of the first clamping member. A plurality of pressing bodies, subdivided by a separating pin in two groups, is received in a longitudinally extending recess of the housing in juxtaposition with the second clamping members. A force exerted by an end cap threadedly mounted at the respective end of the housing is transmitted by the pressing bodies to the respective second clamping members to press the same into clamping engagement with the respective optical fiber connectors received in the V-shaped groove of the first clamping member.

7 Claims, 2 Drawing Figures

COUPLING ARRANGEMENT FOR OPTICAL WAVEGUIDES

BACKGROUND OF THE INVENTION

The present invention relates to coupling arrangements for optical waveguides in general, and more particularly to arrangements for coupling optical fibers at their free ends which are mounted in respective sleeve-shaped connectors.

There are already known various constructions of arrangements for coupling the ends of optical fibers in an axial alignment with one another. Usually, a coupling arrangement of this type includes a housing, at least one clamping member accommodated in the housing adjacent to the optical fiber ends to be coupled, a plurality of pressing members or bodies situated next to the clamping member at th opposite side thereof from that which faces the optical fiber ends, and a pair of end caps mounted at the ends of the housing and acting on the pressing bodies to press the same against the clamping member and thus the latter into clamping engagement with the optical fiber ends. It is also known to mount the optical fiber ends in tubular or sleeve-shaped connectors which protect the fragile material of the fibers against damage due to the clamping forces.

A coupling arrangement of this type is known, for instance, from the German utility patent DE-GM No. 79 35 570. In this construction, the clamping member is constructed as a clamping body which is slotted longitudinally thereof, as well as transversely at its central region. The pressing bodies acting on the clamping body are configured as spheres, or bodies having triangular or trapezoidal cross sections. As advantageous as this conventional arrangement may be in some respects, experience therewith has shown that it leaves much to be desired in other respects, especially as far as the clamping action of the clamping body, due to the pressure exerted thereon by the pressing bodies, on the sleeve-shaped connectors surrounding the optical fiber ends is concerned.

SUMMARY OF THE INVENTION

Accordingly, it is a general object of the present invention to avoid the disadvantages of the prior art.

More particularly, it is an object of the invention to so construct the coupling arrangement for the connector-mounted ends of optical fibers as not to be possessed of the disadvantages of the conventional arrangements of this type.

A further object of the invention is to provide a coupling arrangement of the type here under consideration in which the two sides of the arrangement can be clamped and released independently of one another.

Still another object of the present invention is to so design the arrangement that only a minimum effort is required to achieve a high clamping effect.

It is a concomitant object of the invention to develop a coupling arrangement for optical fiber ends which is simple in construction, inexpensive to manufacture, easy to assemble, and reliable in operation nevertheless.

In pursuance of these objects and others which will become apparent hereafter, one feature of the present invention resides in an arrangement for coupling optical fiber ends mounted in respective sleeve-shaped connectors, which arrangement comprises, in combination, an elongated hollow housing; clamping means in the housing including a prismatic first clamping member extending over the entire length of the housing and having a longitudinally extending V-shaped groove, and a pair of identical second clamping members each extending over a part of the length of the first clamping member in registry with the groove to bound therwith a confining space for receiving the respective connector-mounted optical fiber end; a plurality of pressing bodies received between the housing and the second clamping members; and means for urging the pressing bodies against the second clamping members with an adjustable force to thereby clamp the respective optical fiber ends received in the respective confining spaces between the respective second clamping members and the first clamping member, including a pair of end caps each mounted on one end of the housing and a plurality of urging members respectively interposed between the end caps and the pressing bodies and transmitting forces therebetween.

When the coupling arrangement is const acted in the above-discussed manner, there is obtained the advantage that only a small force needs to be exerted during the assembling operation to achieve an excellent clamping effect in the assembled arrangement. Also, because of the provision of the two second clamping members, it is possible to individually clamp the two connector-mounted optical fiber ends.

The V-shaped groove in the first clamping member itself already prevents the respective connector-mounted optical fiber ends from moving transversely of the clamping members, so that good support is provided for the connector-mounted ends. However, the reliability of the support, and thus of the centering of the optical fiber ends relative to one another can be even improved by resorting to a further expedient of the present invention, which resides in the provision of an elongated groove in each of the second clamping members, this groove facing and registering with the V-shaped groove of the first clamping member and having a cross-sectionally round shape corresponding to that of the respective connector for the optical fiber end to partially conformingly receive such connector. Advantageously, the clamping members have recessed portions at their regions situated laterally of the respective connector-mounted optical fiber ends for forming gaps between the first and second clamping members when the respective optical fiber ends are received in the respective confining spaces. In this manner, it is assured that the clamping members will safely clamp the connectors of the fiber ends between themselves, without interfering with one another.

The clamping effect can be further improved by using elongated cylindrical rollers extending transversely to the elongation of the housing as the pressing bodies. Such cylindrical rollers are capable of achieving uniform distribution of the forces exerted thereon by the end caps via the urging members over the lengths of the respective second clamping members.

In order to simplify the manufacture of the clamping arrangement, the housing is provided, in accordance with another facet of the invention, with a longitudinally extending recess which registers with the second clamping members and receives the pressing bodies in the assembled condition of the arrangement, and with means for subdividing the plurality of pressing bodies into two groups each of which acts on one of the second clamping members independently of the action of the other group on the other second clamping member, this subdividing means including a projection extending into the recess and subdividing the same into two parts each accommodating one of the groups of pressing bodies. The subdividing means advantageously includes a pin-shaped member rigidly mounted on the housing and having the aforementioned projection. It is also proposed according to the invention to give the spacing between the housing and the second clamping members a dimension which exceeds the corresponding dimension of the pressing bodies.

The novel features which are considered as characteristic of the invention are set forth in particular in the appended claims. The improved clamping arrangement itself, however, both as to its construction and its mode of operation, together with additional features and advantages thereof, will be best understood upon perusal of the following detailed description of certain specific embodiments with reference to the accompanying drawing.

DETAILED DESCRIPTION OF THE PREFERRED EMBODIMENT

Figure 1:
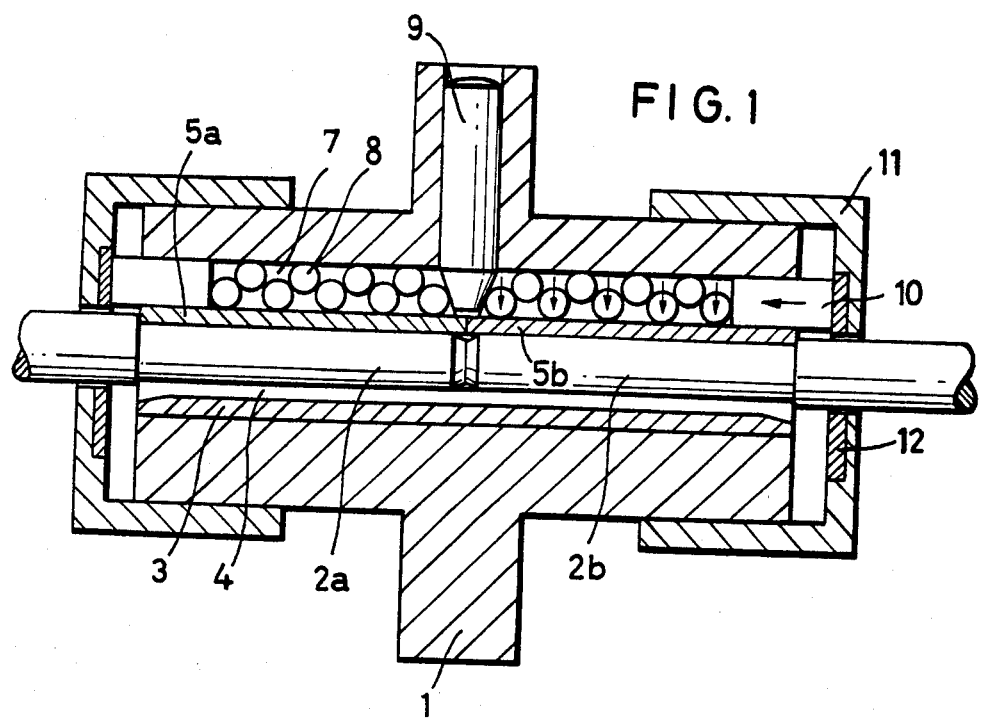
FIG. 1 is a longitudinally sectioned side elevational view of a clamping arrangement of the present invention for connector-mounted ends of optical fibers.

Referring now to the drawing in detail, and first to FIG. 1 thereof, it may be seen therein that the reference numeral 1 has been used to identify a housing of a coupling arrangement for connector-mounted optical fiber ends. The housing 1 is constructed symmetrically with respect to its longitudinal axis as well as to a central transverse plane thereof, and it is provided, at each of its two ends, with openings through which respective connectors 2a and 2b of optical fiber ends pass from the exterior to the interior of the housing 1 to meet in the middle of the interior of the housing 1. The interior of the housing 1 also accommodates a clamping arrangement for the connectors 2a and 2b, this clamping arrangement including an elongated first clamping member 3 of a prismatic configuration which extends over the entire length of the housing and is provided with a longitudinally extending V-shaped groove 4, as well as two identical second clamping members 5a and 5b. In the assembled condition, the connectors 2a and 2b are partially received in the V-shaped groove 4, and the second clamping member 5a overlies the connector 2a in registry with the groove 4, while the second clamping member 5b overlies the connector 2b, also in registry with the V-shaped groove 4.

Figure 2:
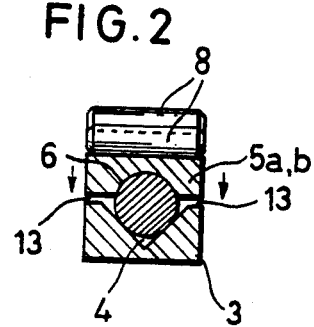
FIG. 2 is a cross-sectional view of the clamping and pressing part of the arrangement of FIG. 1.

As may be seen in FIG. 2, the respective second clamping members 5a and 5b are provided with a round depression or groove 6, the shape of which conforms to that of the circumferential surface of the respective connector 2a and 2b. In the illustrated embodiment, the connectors 2a and 2b are cylindrical, and the grooves 6 are partly cylindrical in conformity therewith.

Upwardly of the second clamping members 5a and 5b, as considered in the position illustrated in the drawing, there is provided in the housing 1 a continuous recess 7 adapted to receive a plurality of cylindrical rollers 8 serving as pressing bodies for pressing the second clamping members 5a and 5b into clamping engagement with the respective connectors 2a and 2b. In order to render it possible to individually clamp and release the respective connectors 2a and 2b by individually establishing and discontinuing the clamping action of the second clamping members 2a and 2b, the continuous recess 7 in the housing 1 is subdivided into two parts by means of a pin-shaped separating member 9 which is accessible from the exterior of the housing 1. The separating member 9 is operative for subdividing the plurality of pressing bodies 8 into two groups, each associated with one of the second clamping members 5a and 5b. The number and the dimensions of the pressing bodies 8 are such as to always leave room at the respective ends of the recess 7 for partially accommodating a respective urging member 10. A respective threaded end cap 11 is threadedly mounted at the respective end of the housing 1, and an intermediate disc 12 is interposed between the end cap 11 and the urging member 10 at each end of the housing 1. Furthermore, the diameters of the pressing bodies 6 are smaller than the spacing between the housing 1 and the respective clamping members 5a and 5b as considered in the recess 7. Thus, as the respective end cap 11 is being tightened, the force exerted thereby on the intermediate disc 12 is applied to the urging member 10 and via the same to the pressing bodies 8 of the respective group, so that such pressing bodies shift relative to one another in the associated part of the recess 7 and thus press the respective clamping member 5a or 5b into clamping engagement with the respectively associated optical fiber connector 2a or 2b. The separating member 9 provides for the individual pressing action of each of the groups of pressing bodies 8 on the associated second clamping member 5a or 5b. Of course, should the separating member 9 be retracted from the recess 7, the arrangement would still be operative, but this time the clamping action would be achieved simultaneously for both of the clamping members 5a and 5b.

FIG. 2 further shows that the clamping members 3, 5a and 5b are provided with recessed portions at their regions disposed laterally of the respective connectors 2a and 2b, so that a gap 13 is provided between these recessed portions. The provision of such gaps 13 is advantageous for achieving unproblematical clamping engagement of the clamping members 3, 5a and 5b with the connectors 2a and 2b.

It will be understood that each of the elements described above, or two or more together, may also find a useful application in other types of arrangements differing from the type described above.

While the invention has been illustrated and described as embodied in an arrangement for clamping connectors accommodating optical fibers, it is not intended to be limited to the details shown, since various modifications and structural changes may be made without departing in any way from the spirit of the present invention. So, for instance, the connectors could be constituted by the end portions of the optical fibers themselves.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. An arrangement for coupling optical fiber ends mounted in respective connectors, comprising an elongated hollow housing; clamping means in said housing including a prismatic fiber clamping member extending over the entire length of said housing and having a longitudinally extending V-shaped groove, and a pair of identical second clamping members each extending over a part of the length of said first clamping member in registry with said groove to bound therewith a confining space for receiving the respective connector-mounted optical fiber end; a plurality of pressing bodies of circular cross-sections received between said housing and said second clamping members; and means for urging, in longitudinal direction of said housing, said pressing bodies against each other and hence against said second clamping members with an adjustable force to thereby clamp the respective optical fiber ends received in the respective confining spaces between the respective second clamping members and said first clamping member, including a pair of end caps each mounted on one end of said housing, and a plurality of urging members respectively interposed between said end caps and said pressing bodies and transmitting forces therebetween.

2. The coupling arrangement as defined in claim 1, wherein each of said second clamping members has an elongated groove facing and registering with said V-shaped groove of said first clamping member and having a cross-sectionally round shape corresponding to that of the respective connector-mounted optical fiber end for partially receiving the latter.

3. The coupling arrangement as defined in claim 1, wherein said clamping members have respective recessed portions at their regions situated laterally of the respective connector-mounted optical fiber ends for forming gaps between said first and second clamping members when the respective optical fiber ends are received in the respective confining spaces.

4. The coupling arrangement as defined in claim 1, wherein said pressing bodies are configurated as elongated cylindrical rollers extending transversely to the elongation of said housing.

5. The coupling arrangement as defined in claim 1, wherein said pressing bodies have a predetermined transverse dimension; and wherein the spacing between said housing and the respective second clamping members exceeds said predetermined dimension.

6. An arrangement for coupling optical fiber ends mounted in respective connectors, comprising an elongated hollow housing; clamping means in said housing including a prismatic first clamping member extending over the entire length of said housing and having a longitudinally extending V-shaped groove, and a pair of identical second clamping members each extending over a part of the length of said first clamping member in registry with said groove to bound therewith a confining space for receiving the respective connector-mounted optical fiber end; a plurality of pressing bodies received between said housing and said second clamping members; means for urging said pressing bodies against said second clamping members with an adjustable force to thereby clamp the respective optical fiber ends received in the respective confining spaces between the respective second clamping members and said first clamping member, including a pair of end caps each mounted on one end of said housing, and a plurality of urging members respectively interposed between said end caps and said pressing bodies and transmitting forces therebetween; and wherein said housing has a unitary longitudinal recess registering with said second clamping members for receiving said pressing bodies; and further comprising means for subdividing said plurality of pressing bodies into two groups each acting on one of said second clamping members independently of the action of the other group on the other second clamping member, including a projection extending into said recess and subdividing the same into two parts.

7. The coupling arrangement as defined inclaim 6, wherein said subdividing means includes a pin-shaped member rigidly mounted on said housing and having said projection.

* * * * *